(No Model.)

E. F. LEIGHTON.
GALVANIC BATTERY.

No. 324,708. Patented Aug. 18, 1885.

WITNESSES
W. G. Button
A. W. Spear

INVENTOR
Edwin F. Leighton
by W. B. H. Dowse
his atty.

UNITED STATES PATENT OFFICE.

EDWIN F. LEIGHTON, OF BOSTON, MASSACHUSETTS, ASSIGNOR OF ONE-HALF TO JAMES SERSON, OF SAME PLACE.

GALVANIC BATTERY.

SPECIFICATION forming part of Letters Patent No. 324,708, dated August 18, 1885.

Application filed March 23, 1885. (No model.)

*To all whom it may concern:*

Be it known that I, EDWIN F. LEIGHTON, residing at Boston, in the county of Suffolk and Commonwealth of Massachusetts, have invented certain new and useful Improvements in Galvanic Batteries; and I do hereby declare the following to be a full, clear, concise, and exact description of the invention, such as will enable others skilled in the art to which it appertains to make and use the same, reference being had to the accompanying drawings, and to the letters of reference marked thereon, which form a part of this specification.

My invention relates to improvements in galvanic batteries of the class using a copper positive element and sulphate-of-copper solution as a depolarizing liquid.

The object of my invention is to produce a battery which shall give a uniform and strong current of electricity for a long time and overcome nearly, or entirely, several of the difficulties and losses experienced in previously-constructed batteries.

The advantages which I obtain by my improved construction are no local action of any amount and no short circuit in the use; less internal resistance because the two metals are placed nearly together; producing more useful electro-motive force; and, finally, a great saving in labor and material required in cleaning and recharging the battery.

In batteries as at present constructed the sulphate-of-copper crystals in the bottom of the jar soon become foul by the sediments resulting from the decomposition of the zinc, and the whole cell must frequently be taken apart, the elements cleaned, and the sulphate-of-copper crystals removed and washed, thus entailing considerable labor and much waste of material, a large amount of sulphate of copper being inevitably dissolved and washed away. I avoid this latter objection by so constructing my cell that a suitable receptacle is provided to catch the impurities resulting from the decomposition of the zinc, this receptacle being readily removable from the cell, so that the refuse can be cleared away without disturbing the copper-sulphate crystals.

The other advantages claimed for my battery will be clearly shown in the description hereinafter set forth.

Figure 1:
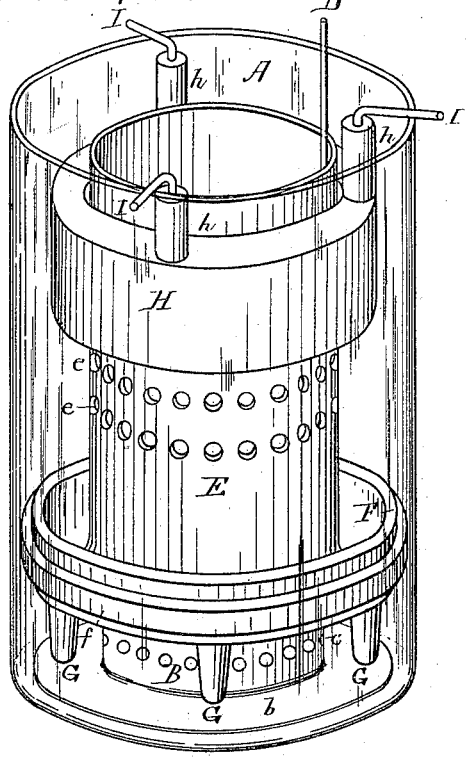
Figure 2:
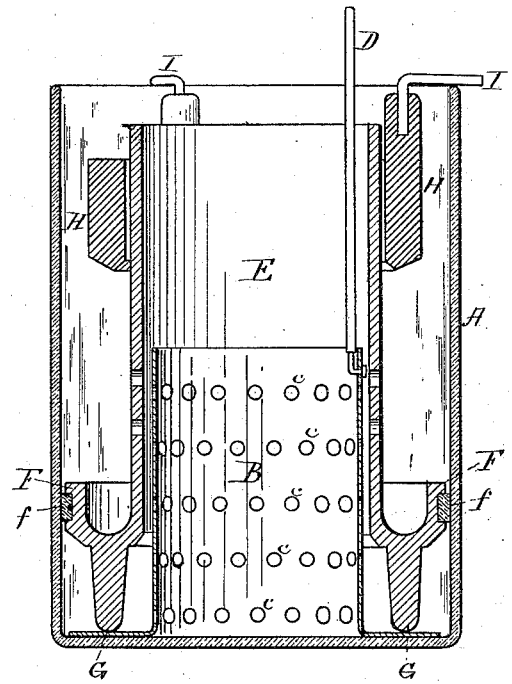
Figure 3:
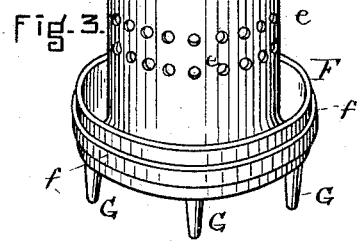
Figure 4:
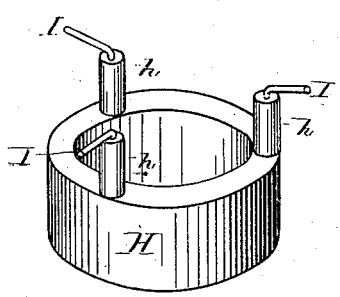
Figure 5:
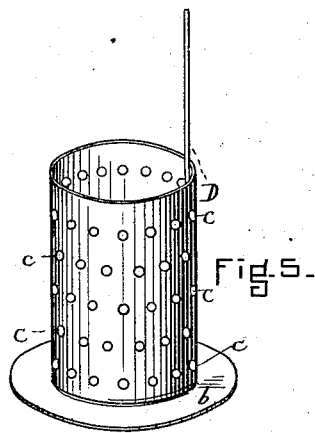

In the accompanying drawings, Figure 1 is a perspective view of the complete cell, showing all the parts. Fig. 2 is a vertical section of the complete cell. Fig. 3 is a perspective view of the zinc. Fig. 4 is a perspective view of the earthenware cylinder. Fig. 5 is a perspective view of the copper cylinder.

The cell when completed consists of an outer jar, A, of glass or other suitable material. Within this is placed, resting on the bottom of the jar, the cylinder of sheet-copper B, having its lower end turned outward into a flange, b, and perforated with numerous holes, C. A connecting-wire, D, is attached to the copper sheet. This copper element may be made up as follows: A sheet of copper of a width equal to the height of the finished cylinder, or about one-half the height of the outer jar and of a length equal to the required circumference, is bent up on one of its longer sides at right angles to the remainder of the sheet, forming a flange of about one inch in width. The body of the sheet is perforated with numerous small holes, and the whole is bent into a cylindrical form. It is not necessary to solder or fasten the ends.

Over the copper cylinder B an earthenware cylinder, E, is placed. This cylinder is nearly equal in height to the outer jar, and is open at the bottom as well as at the top. A narrow circular trough surrounds the cylinder at or near the bottom, and closely fits the inside of the outer jar, A, perfect contact being insured by a band of rubber or other suitable material, f. The bottom of the earthenware cylinder has three or more legs, G, to support it clear of the bottom of the outer jar. A series of small holes, e, are made in the cylinder. Outside of the earthenware cylinder a short hollow cylindrical zinc, H, is placed, having cylindrical upward projections h, to which wires I are attached and bent at right angles. These are intended to act as supports for the zinc by resting on the top of the glass outside jar, and any one of them may be used as a point of attachment for the connecting-wire.

The method of setting up and operating a cell of my improved battery is as follows: Put the copper cylinder in the glass jar, resting on the bottom. Then completely fill this copper cylinder with sulphate-of-copper crystals. Then place the earthenware cylinder over the copper cylinder, and fill it with sulphate-of-copper crystals to within an inch and one-half of the top. Next place the zinc over the earthenware cylinder, its wire supports resting on the top edges of the glass jar. The upper edge of the zinc will then be slightly below the top of the earthenware flanged cylinder. Then fill the jar with water to cover the zinc, making the necessary connections, and the battery will be in working order. The holes in the earthenware vase should be one inch or more above the trough or flange of the earthenware cylinder and at an equal distance below the bottom of the zinc. This is to prevent, as far as possible, local action. The earthenware cylinder may be, but is not necessarily, made of porous clay. The two metals forming the electrodes of the battery are so placed that contact and consequent short-circuiting is impossible.

To entirely prevent any of the products of decomposition settling in the bottom of the battery-cell, a band of rubber or other suitable flexible material is placed around the flange which forms the trough of the earthenware vase, so as to be between it and the inside of the outer jar.

In cleaning the battery the sulphate-of-copper crystals do not require washing, as the zinc is entirely separated from the vessel containing the crystals, and the sediment resulting from the decomposition of the zinc is collected in the trough or flange which forms a part of the earthenware cylinder, leaving the crystals about as clean at the end of six or eight months as when the battery was first charged. All that it is necessary to do to clean the battery is to lift out the zinc, then remove the earthenware cylinder, and thoroughly clean it. The various parts can then be replaced and the necessary amount of crystals of sulphate of copper added to bring it up to the proper level. The crystals remaining in the cell need not be removed, or, if removed, do not require washing.

It is obvious that my improved flanged cylinder may be made of glass or other non-conducting material unacted upon by the acids or chemical solutions usually employed in charging batteries, and that it may be used with a copper electrode of a different form from the one shown, or with electrodes of carbon or other material. When the band is not used, the perforations in the earthenware cylinder may be omitted, as in that case the liquid can circulate freely above and below this cylinder.

I am aware that a feeding cylinder or tube provided with perforations and having a residue receiver formed or attached thereto has been used heretofore in a gravity battery.

Having now fully described my invention, what I claim, and desire to secure by Letters Patent, is—

1. A hollow perforated cylinder of earthenware or other suitable material for use in galvanic batteries between the two electrodes, provided with a flange forming a trough surrounding it at or near the bottom and adapted to fit the sides of the outer jar closely, all substantially as and for the purpose set forth.

2. A hollow cylinder of earthenware or other suitable material for use in a galvanic battery between the two electrodes, provided with one or more series of perforations and also with a trough-shaped flange adapted to fit the sides of the outer jar closely at or near its bottom, substantially as shown and set forth.

3. A perforated hollow cylinder of earthenware or other suitable material for use in a galvanic battery between the two electrodes thereof, provided with a trough-shaped flange surrounding it, the outside of the flange being encircled by a band or packing of rubber or other suitable material, all substantially as shown and for the purpose set forth.

4. A galvanic battery consisting of an outer jar, a perforated cylinder of copper provided with a flange at the bottom, a perforated hollow cylinder of earthenware or other suitable material having a trough-shaped flange surrounding it and legs to support it above the bottom of the jar, a zinc cylinder surrounding the earthenware cylinder at the top and supported by the outer jar, and of sulphate of copper or other liquid used to charge the cell, all arranged and used for the purpose herein specified, substantially as described.

5. A galvanic battery consisting of an outer jar, a perforated cylinder of copper provided with a flange at the bottom, a perforated hollow cylinder of earthenware or other suitable material having a trough-shaped flange surrounding it and feet to support it above the bottom of the jar, a band of rubber around the outside of the said flange to make close contact between it and the outside of the glass, a perforated cylinder surrounding the earthenware cylinder at the top, and the sulphate of copper or other liquid used to charge the cell, all arranged and used for the purpose herein specified, and substantially as described.

6. A galvanic battery consisting of the jar A, a perforated cylindrical copper plate, B, bent as at $b$, a perforated flanged hollow cylinder of earthenware or other suitable material, E, a rubber band, $f$, the zinc H, provided with supports $h$ I, the necessary connections, and the charging liquid, all arranged substantially as shown and described, and for the purpose set forth.

In witness whereof I have hereunto set my hand.

EDWIN F. LEIGHTON.

Witnesses:
WM. B. H. DOWSE,
H. E. BARRY.